Nov. 28, 1950     C. A. GUSTAFSON     2,531,621
SPRING SUPPORT FOR VEHICLE RUNNING GEARS
Filed Dec. 13, 1945     5 Sheets-Sheet 1

INVENTOR.
Carl A. Gustafson
BY
Charles M. Fryer
ATTORNEY.

Nov. 28, 1950     C. A. GUSTAFSON     2,531,621
SPRING SUPPORT FOR VEHICLE RUNNING GEARS

Filed Dec. 13, 1945     5 Sheets-Sheet 3

INVENTOR.
Carl A. Gustafson
BY
Charles M. Fryer
ATTORNEY

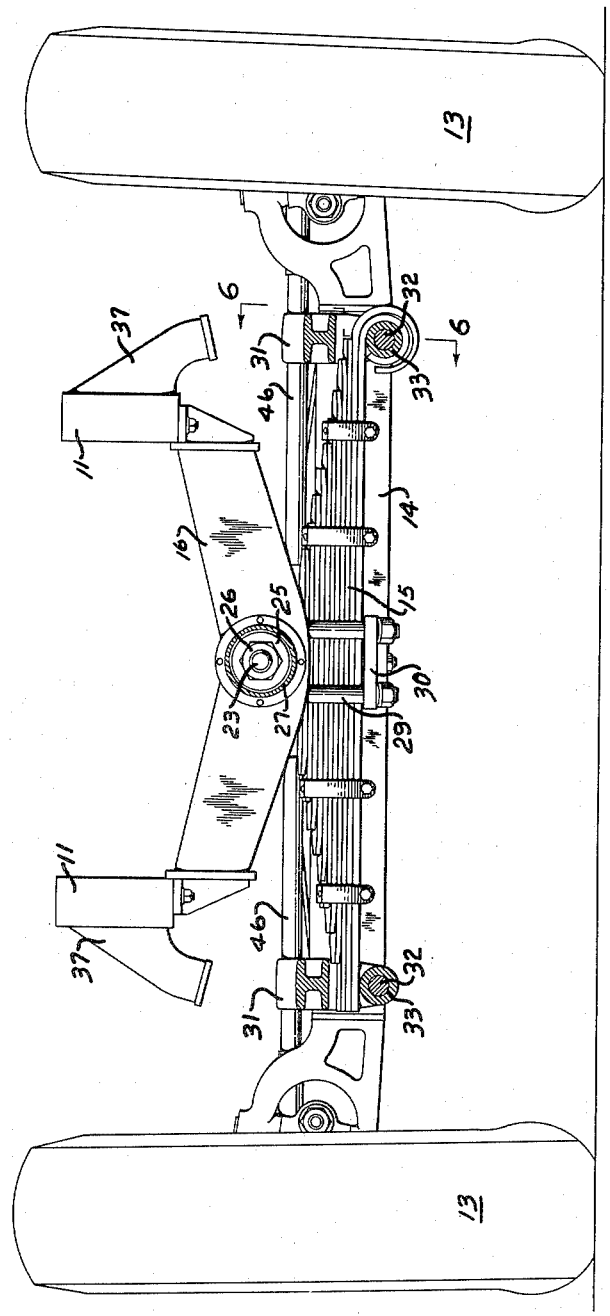

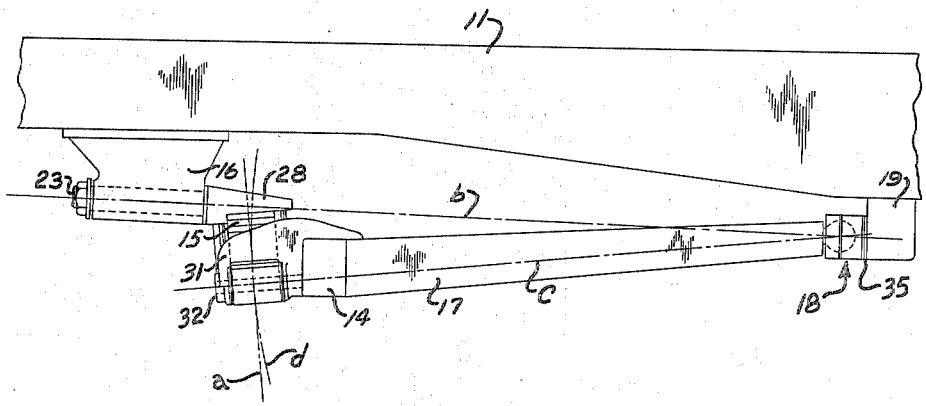
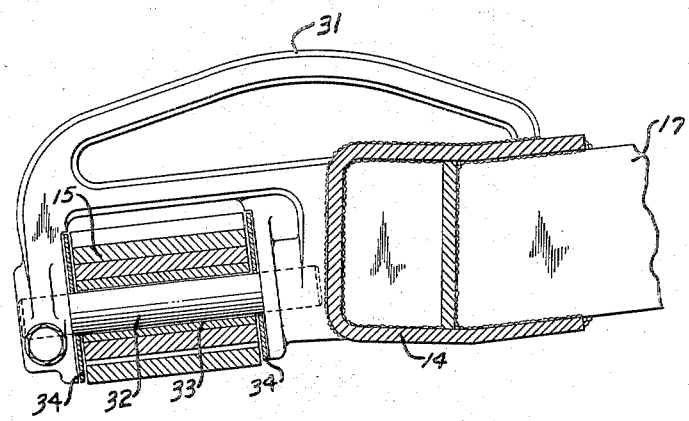

Patented Nov. 28, 1950

2,531,621

UNITED STATES PATENT OFFICE 2,531,621

SPRING SUPPORT FOR VEHICLE RUNNING GEARS

Carl A. Gustafson, Peoria, Ill., assignor to Caterpillar Tractor Co., San Leandro, Calif., a corporation of California Application December 13, 1945, Serial No. 634,639

2 Claims. (Cl. 280—112)

This invention relates to vehicle suspensions and particularly to the suspension or mounting of the front axle of a wheeled vehicle such, for example, as a four wheeled tractor.

In heavy vehicles such as tractors, it is desirable that the front axle be centrally pivoted to permit it to oscillate within certain limits with relation to the frame of the vehicle. Such oscillation contributes to smooth operation of the vehicle as it permits either of the front wheels to ride over obstructions without tending materially to rock the vehicle from side to side or impart a twisting action to its frame. Previously known centrally pivoted axle arrangements have, however, had many disadvantages and particularly the disadvantage that inadequate and improper support of the axle has placed undesirable strains on the spring by which it is supported, as well as upon other parts of the axle assembly and steering mechanism.

It is an object of the present invention to provide an improved vehicle suspension embodying a centrally pivoted front axle and to provide an assembly in which a spring which supports the front axle is arranged for free flexing movement with a minimum of strain and without distortion except on its normal plane of flexure. A further object of the invention is the provision of a centrally arranged steering mechanism in combination with a centrally pivoted front axle. Further and more specific objects and advantages of the invention will be made apparent in the following specification wherein the manner in which the foregoing objects are accomplished is set forth in detail by reference to the accompanying drawings.

In the drawings:

Fig. 4 is a front elevation with parts in section of the suspension means illustrated in Fig. 3;

Fig. 5 is a diagrammatic view illustrating the angular position assumed by the spring in the suspension; and Fig. 6 is an enlarged fragmentary sectional view taken on the line 6—6 of Fig. 4.

Figure 1:
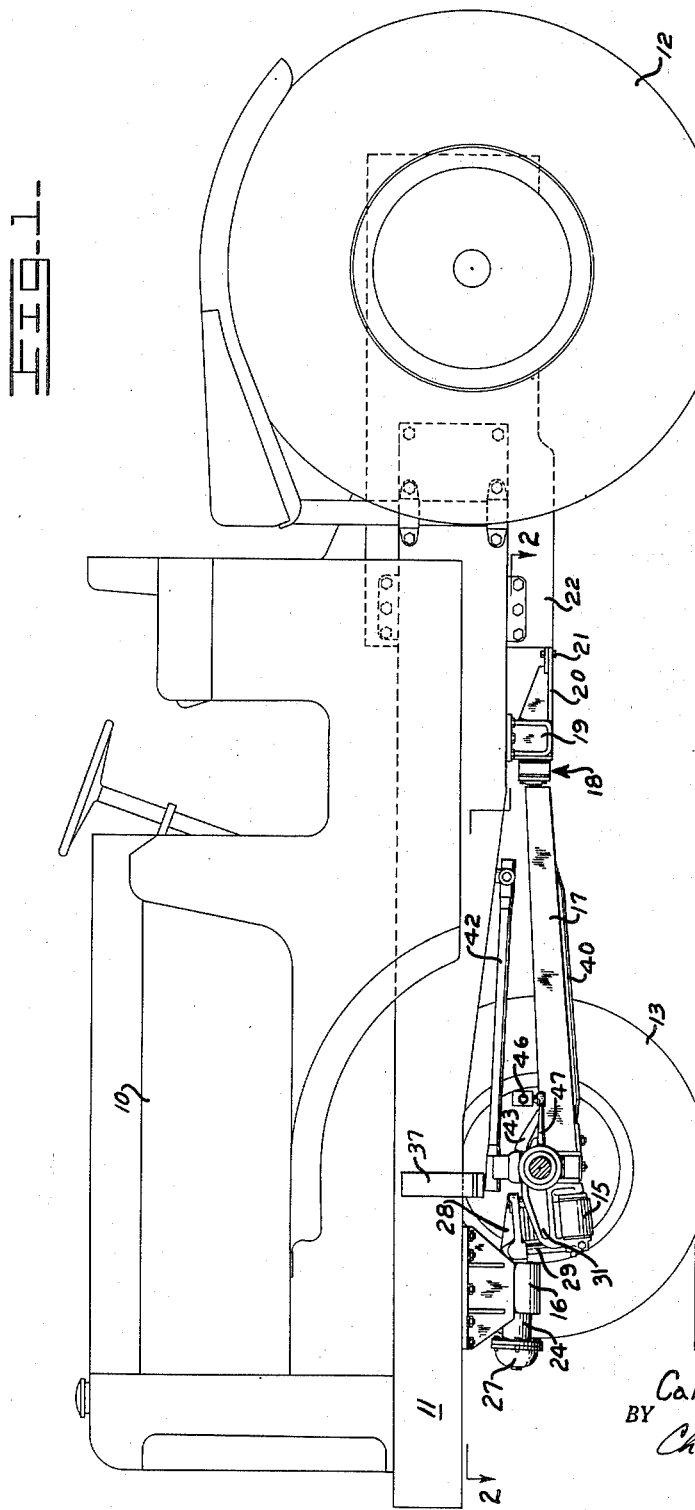
Fig. 1 is a side elevation of a wheel type tractor with one front wheel removed illustrating the front wheel suspension of the present invention.

Referring to Fig. 1 of the drawings, a conventional tractor is illustrated as having a power unit indicated at 10 supported on frame members 11 which are conventionally supported at the rear by wheels 12 and adjacent their forward ends by front wheels 13 which are connected with the frame members by the suspension means of the present invention. The front wheels 13 are conventionally pivoted to the outer ends of a transverse axle 14, see Figs. 2 and 3, which is connected adjacent its outer ends to a leaf spring 15 which is centrally and pivotally connected with a transverse bolster 16 extending between the frame members 11. A pair of tie rods or struts 17 are secured to the rear of the axle 14 and converge rearwardly therefrom to a universal or ball and socket joint generally indicated at 18 supported centrally of a frame bolster 19 which is also braced as by a bracket 20 which extends rearwardly and is secured as by bolts 21 to a part 22 of the gear case of the tractor power unit.

Figure 3:
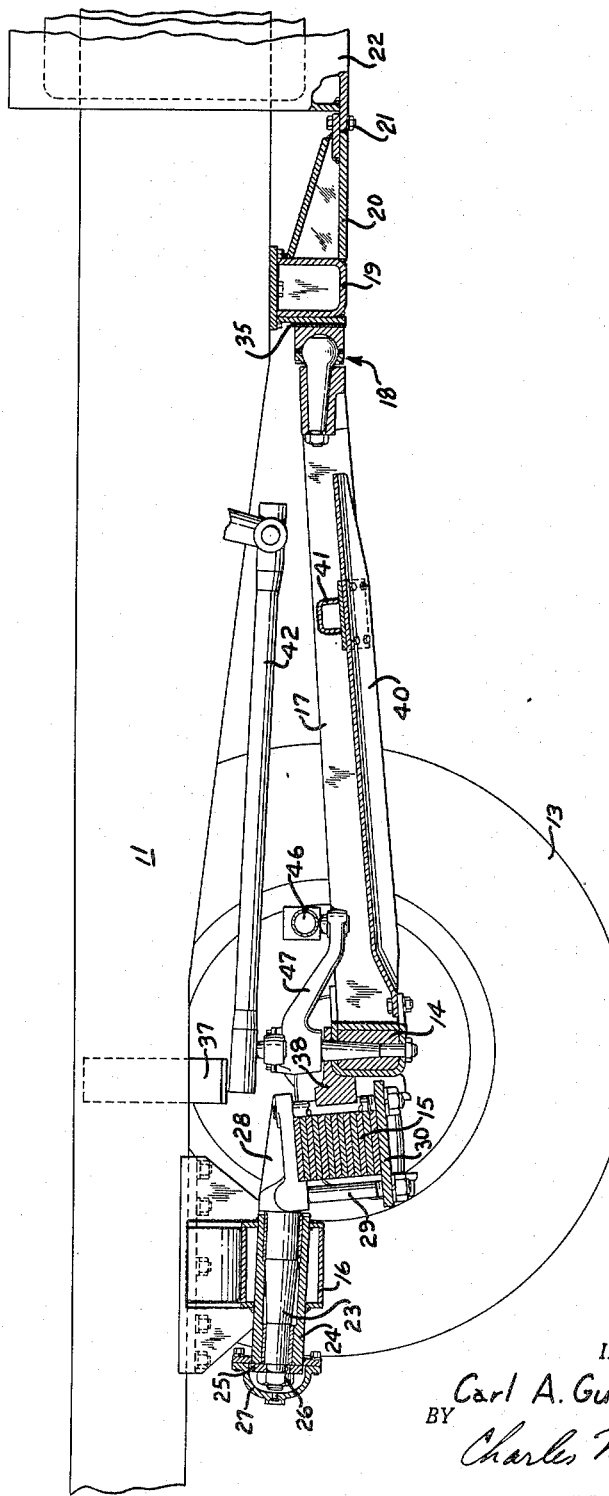
Fig. 3 is a vertical sectional view taken on the line 3—3 of Fig. 2.

The connection between the spring 15 and the bolster 16 comprises, as best illustrated in Fig. 3, a pivot pin 23 journaled in suitable bearings within a housing 24 which extends through and is secured to the bolster. A thrust collar 25 is secured against a shoulder on the forward end of the pivot pin 23 by a nut 26, and a cap 27 preferably encloses this forward end of the pivot pin and provides a lubricant reservoir therefor. At the rear end of the pivot pin 23, and preferably formed integrally therewith, is a spring saddle 28 which together with bolts 29 and a clamp plate 30 securely embraces the spring at its center in a conventional manner. The saddle 28 is sufficiently large to prevent forward thrust of the pivot pin 23 as the collar 25 prevents rearward thrust thereof. This structure provides a central pivotal support for the spring the outer ends of which are connected with the axle 14 by brackets 31, one of which is shown in detail in Fig. 6. The brackets 31 are welded or otherwise rigidly secured to and extend forwardly from the axle 14 and each bracket includes a pin 32 for supporting an end of spring 14. At one end, as illustrated in Fig. 4, the longer leaves of the spring are curved around the pin 32 and at the opposite end they overlie the pin to permit freedom of movement longitudinally of the spring leaves as the spring is flexed. The pins 32 are preferably embraced by bearing bushings 33 and some space is provided between the edges of the spring leaves and the bracket member 31 in order to permit slight movment of the spring longitudinally of the pins 32 for reasons which will presently appear. Washers or wear plates shown at 34 in Fig. 6 are preferably provided in this space to prevent wear of the brackets by engagement of the spring leaves therewith.

Spring saddle 28 and the brackets 31 are arranged to support the spring 14 at an angle with relation to the conventional vertical position in which such springs are customarily supported. This is best illustrated in Fig. 5 of the drawings where the spring is illustrated as supported with its plane of flexure represented by the line $a$, the plane of flexure being a plane at right angles to the flat or broader surfaces of the spring leaves, and representing the direction in which flexing normally occurs. The pivot pin 23 is disposed with its longitudinal axis on a line $b$ which intersects the center of the ball and socket joint 18. This joint is also intersected by lines $c$ coincident with the centers of the pins 32 which support the outer ends of the spring 14 and which are fixed in position with relation to the axle by means of brackets 31. Upon any flexing of the spring 15, which is accompanied by raising ad lowering of the axle 14, the outer ends of the spring tend to move in the plane $a$. There is also, however, a tendency for them to follow the arc $d$ which originates at the center of the ball and socket joint 18 to which the axle is connected by means of the struts 17. The plane of flexure $a$ of the spring is tangent to the arc $d$ and under normal load the ends of the spring are at or adjacent the point of tangency. As the vertical movement of the spring is slight, the distance between the spring ends, moving in the plane of flexure $a$, and arc $d$ never tends to become great during normal flexing of the spring either under compression or rebound. Therefore, even if the spring ends were snugly fitted in the brackets 31 only a slight strain would be imposed upon the spring and other members due to the tendency toward twisting the spring away from its plane of flexure upon its deflection. Because of the fact that the spring ends are free to slide longitudinally of the pins 32 by which they are supported, even this slight strain is avoided as the brackets 31 are free to swing along the arc $d$ while the spring is flexing in the tangent plane $a$. Consequently, all necessary flexing of the spring takes place without a tendency to deflect it from its normal plane of flexure or to impose unnecessary strain upon any of the parts connected with the spring.

In order to provide the proper spacing on opposite sides of the spring when its ends are mounted in the bracket 31, the ball and socket joint 18 is made adjustable by the provision of shims 35 interposed between the socket portion of the joint and the bolster 19 to which it is connected by means of studs 36. By varying the number of shims 35, the axle 14, together with its spring brackets 31, can be adjusted to provide substantially equal spaces at both edges of the spring where it is embraced by the brackets 31.

Oscillation of the front axle with relation to the tractor frame is preferably limited by stop members 37 which, as shown in Fig. 4, are positioned for engagement with the tops of the brackets 31 as the axle assembly rocks about the center of the pivot pin 23.

Both deflection and rebound of the spring 15 are preferably limited as by a stop member 38 (Fig. 3) suitably secured to and extending forwardly from the axle and engageable upon deflection of the spring with the saddle 28 and upon rebound of the spring with the plate 30.

A guard plate 40 which affords protection to the lower portions of the power unit may conveniently be supported between the axle 14 and a transverse member 41 which extends between the struts 17.

Figure 2:
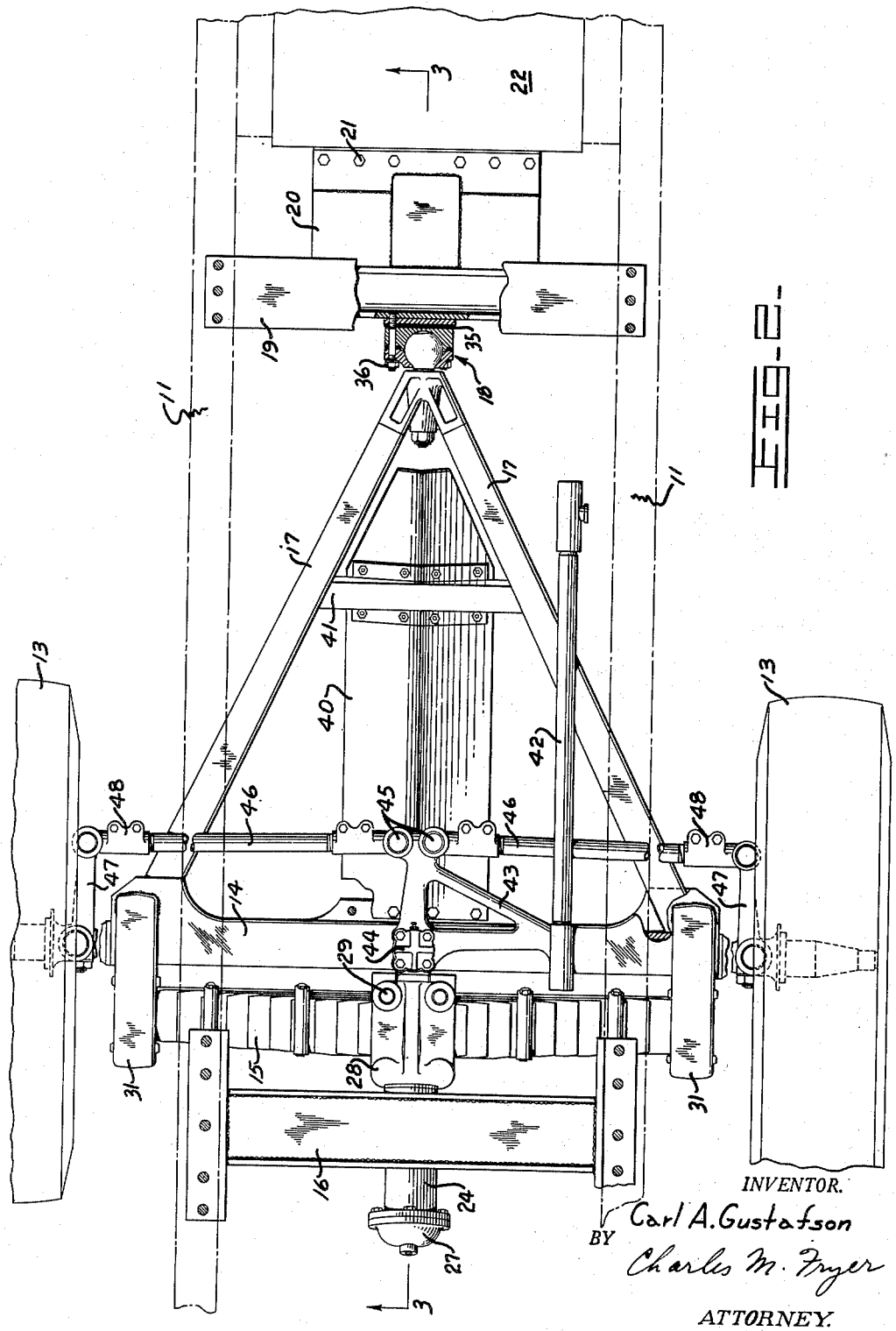
Fig. 2 is a horizontal view taken on the line 2—2 of the drawings with a portion of the main frame shown in broken lines to illustrate its relationship to the front wheel suspension.

A centrally arranged or so-called "center point" steering apparatus is particularly desirable in conjunction with a center pivoted front wheel suspension of the kind herein disclosed and is provided by the structure illustrated in Figs. 2 and 3. As shown in these figures, a conventional drag link 42, adapted to be reciprocated in the direction of its own length by steering mechanism, not shown, is pivotally connected at its forward end with a bell crank 43. The bell crank is pivoted as at 44 centrally of the axle 14, and is also pivotally connected by couplings 45 with tie rods 46 which extend outwardly to, and are connected with conventional steering knuckles 47 through the medium of couplings 48. Movement of the drag link 42 in response to manipulation of the steering wheel will therefore swing the bell crank 43 about its pivot 44 and impart steering movement to the wheels 13 through the tie rods 36 and steering knuckles 47. The centrally disposed pivot 44 of the bell crank 43 provides a connection for the tie rod 42 which is relatively close to the center of the front wheel suspension. Therefore, rocking movement of the front axle with relation to the vehicle frame will cause only a relatively small deflection of the drag link. With this construction the drag link is also disposed between the vehicle frame members 11 thus eliminating any possibility of interference between the drag link and the front wheels as the wheels are swung during the negotiation of a sharp turn.

I claim:

1. In combination with a vehicle having a frame, a spring disposed transversely of the frame, a centrally disposed pivotal connection between the spring and the frame, an axle connected adjacent its opposite ends to the spring, a universal joint on the frame in alignment with the axis of said pivotal connection, and struts connecting the axle with said universal joint and means for supporting the spring at an angle with its plane of flexure normal to a plane intersecting the universal joint and the axle.

2. In a vehicle suspension, a spring disposed transversely of the vehicle, a central pivot connecting the spring with the vehicle, an axle connected with the spring and disposed adjacent and generally parallel to it, tie rods connected with the axle at one end, a universal connection aligned with said pivot between the opposite ends of the tie rods and the vehicle and means between the said pivot and the spring for supporting the spring at an angle with its plane of flexure normal to a plane intersecting the axle, the tie rods and the universal connection.

CARL A. GUSTAFSON.

REFERENCES CITED

The following references are of record in the file of this patent:

UNITED STATES PATENTS

| Number | Name | Date |
|---|---|---|
| 686,235 | Morgan et al. | Nov. 5, 1901 |
| 801,521 | Haas | Oct. 10, 1905 |
| 1,095,137 | Bailey | Apr. 28, 1914 |
| 1,212,160 | Frederick | Jan. 9, 1917 |
| 1,288,757 | Timm | Dec. 24, 1918 |
| 1,323,849 | Evans | Dec. 2, 1919 |
| 1,348,512 | Mills | Aug. 3, 1920 |
| 1,560,176 | Hawkins et al. | Nov. 3, 1925 |
| 1,564,090 | Meiklejohn | Dec. 1, 1925 |
| 1,995,500 | Dillon | Mar. 26, 1935 |
| 2,123,335 | Herreshoff | July 12, 1938 |

FOREIGN PATENTS

| Number | Country | Date |
|---|---|---|
| 25,420 | Great Britain | Nov. 15, 1911 |
| 180,711 | Great Britain | May 24, 1922 |